Nov. 8, 1966 R. M. STEWART 3,284,772

DATA CORRELATION APPARATUS EMPLOYING CATHODE-RAY TUBE INPUT AND VARIABLE RESISTANCE DATA STORAGE AND COMPARISON

Filed Nov. 22, 1961 2 Sheets-Sheet 1

ROBERT M. STEWART
INVENTOR.

BY Allen Z. Botney

ATTORNEY

DATA CORRELATION APPARATUS EMPLOYING CATHODE-RAY TUBE INPUT AND VARIABLE RESISTANCE DATA STORAGE AND COMPARISON

Filed Nov. 22, 1961

ROBERT M. STEWART
INVENTOR.
BY Allen E. Botney
ATTORNEY

United States Patent Office 3,284,772

Patented Nov. 8, 1966

3,284,772

DATA CORRELATION APPARATUS EMPLOYING CATHODE-RAY TUBE INPUT AND VARIABLE RESISTANCE DATA STORAGE AND COMPARISON

Robert M. Stewart, Los Angeles, Calif., assignor to Space-General Corporation, Glendale, Calif.

Filed Nov. 22, 1961, Ser. No. 154,185
14 Claims. (Cl. 340—146.3)

The present invention relates in general to data correlation systems and more particularly to data correlation apparatus employing electron-optical means and techniques to provide data identification.

In many fields, such as in the computer art, for example, it is necessary to store relatively large amounts of information or data on some storage medium so that unknown data may be identified at some later time by comparing it to the stored data. This is true not only in the computer art but also in the arts of message coding and decoding, terrain recognition, and a host of others too numerous to completely delineate here. The present invention provides apparatus of an electron-optical nature for making identifications of the type mentioned.

In my Patent 3,125,683, I disclosed an optical data correlator using photographic transparencies for data storage and optical image input. Image sampling and comparison with the stored data pattern was achieved in accordance with that invention using fiber optics or multiple mirrors. I have determined that data correlation can also be achieved using electron beam imaging, variable resistance, data storage and comparison.

In accordance with the basic concept of the present invention, an electrical or electron image of the data pattern to be identified is simultaneously compared with electrical "transparencies" of all the stored or admissable data patterns, the greatest amout of electrical current, being passed through the one "transparency" where the patterns are most identical. As used herein, the word "transparency" is intended to connote and is hereby defined as a pattern formed by means of variable conductivity that has a definite correspondence to an image or pattern to be recognized. In the present instance, there are as many different such transparencies as there are different images to be ultimately identified, one transparency for each abovesaid image. Considering the concept of the present invention with greater particularity, an electron beam formed into a pattern is applied to a medium by means of which the pattern is simultaneously compared with the several transparencies or variable conductivity patterns. An electric field applied to the medium through the transparencies causes ahe current to flow through the transparencies at those points whereat the electron-beam pattern overlays or, stated differently, coincides with the variable-conductivity patterns, the maximum aggregate current flowing through that transparency that most closely coincides overall with the pattern of the electron beam. The different amounts of aggregate current thusly obtained are stored and then compared, recognition of the electron-beam pattern being made by determining through which one of the transparencies the maximum current had passed.

According to one embodiment of the invention that is especially well-suited for illustrating and explaining the principles involved, a plurality of small metal plates are mounted immediately inside the face of a cathode-ray tube. These plates are connected to a number of very high valued and relatively low valued resistor combinations or matrices, the number of such matrices being equal to the number of different patterns to be recognized. The high-valued resistors may be open circuits and, in fact, open circuits are preferred in this first embodiment, as will more fully be seen later. Furthermore, the resistors in each matrix are arranged differently than those in every other matrix and in such a way that these matrices respectively have a definite correspondence with the unknown patterns or images. Integrate and dump circuits are respectively coupled to the resistor matrices, a positive voltage being applied through these circuits to the matrices and through the low-valued resistors therein to the abovesaid plates.

In operation, an electron beam that is intensity-modulated to form a pattern is made to sweep across each of the plates in turn, the current incident on any one plate flowing only through the low-valued resistors connected to that plate. This current is collected and stored in the integrate and dump circuits, the greatest amount of current being stored, during any one complete sweep period, in the circuit coupled to the resistor matrix having the greatest correspondence to the electron-beam pattern. At the end of the complete sweep interval, means are employed to detect whereat the greatest amount of current is stored and, immediately thereafter, to discharge the different integrate circuits, thereby making them available for the next occurring pattern.

According to another and more preferred embodiment of the invention, a large number of wire conductors are gathered together to form a main bundle or cable, the two ends of these wires being differently arranged to form two different sets of smaller bundles or cables within the main one. More specifically, the input ends of the wires are equally divided into smaller groups with the different groups thusly formed insulated from each other, thereby producing one of the abovesaid sets of smaller cables. The output ends of the wires, on the other hand, are arranged differently than their input ends and in a most novel manner to produce the other of the abovesaid sets of smaller cables, there being as many output cables as data patterns stored as transparencies on a memory plate. Furthermore, whereas at the input end only the groups were electrically insulated from each other, on the output end the individual wires in each group are electrically insulated from each other. Suffice it to say at this time that the output ends of the wires in the main cable are arranged in such a way that its output face contains many replicas or duplicates of its input face. The input end or face of the main cable is used to replace a portion of the face of a cathode-ray tube, the output end or face of this larger cable being positioned contiguously to the memory plate with the smaller cables in registration with the transparencies thereon. The transparencies are respectively coupled to integrate and dump circuits through which, as before, a positive potential is uniformly applied to all the transparencies.

In its operation, the electron beam incident upon the input face is directed back and forth across the face until, at the end of the allotted sweep period, the entire face has been covered. The electron beam is intensity modulated so that, in essence, some areas on the input face receive electrons while other areas do not, with the result that an electron-beam pattern is ultimately formed and projected upon the input face. This applied pattern is compared with all the stored conductivity patterns, current flowing through the cable wires and through the transparencies to the integrator networks only at those points where the input and stored pattern coincide. It will be recognized that the largest amount of current flow will pass through the transparency whose conductivity pattern fully coincides with the unknown applied pattern. As before, identification is made by determining which network has stored the most charge during the entire sweep interval.

It will be obvious from what has already been said that a principal object of the present invention is to provide a way for rapidly identifying patterns formed by electron beams.

It is another object of the present invention to use electron-optical techniques to obtain recognition of an unknown data signal.

The novel features which are believed to be characteristic of the invention, both as to its organization and method of operation, together with further objects and advantages thereof, will be better understood from the following description considered in connection with the accompanying drawings in which two embodiments of the invention are illustrated by way of example. It is to be expressly understood, however, that the drawings are for the purpose of illustration and description only and are not intended as a definition of the limits of the invention.

Figure 1:
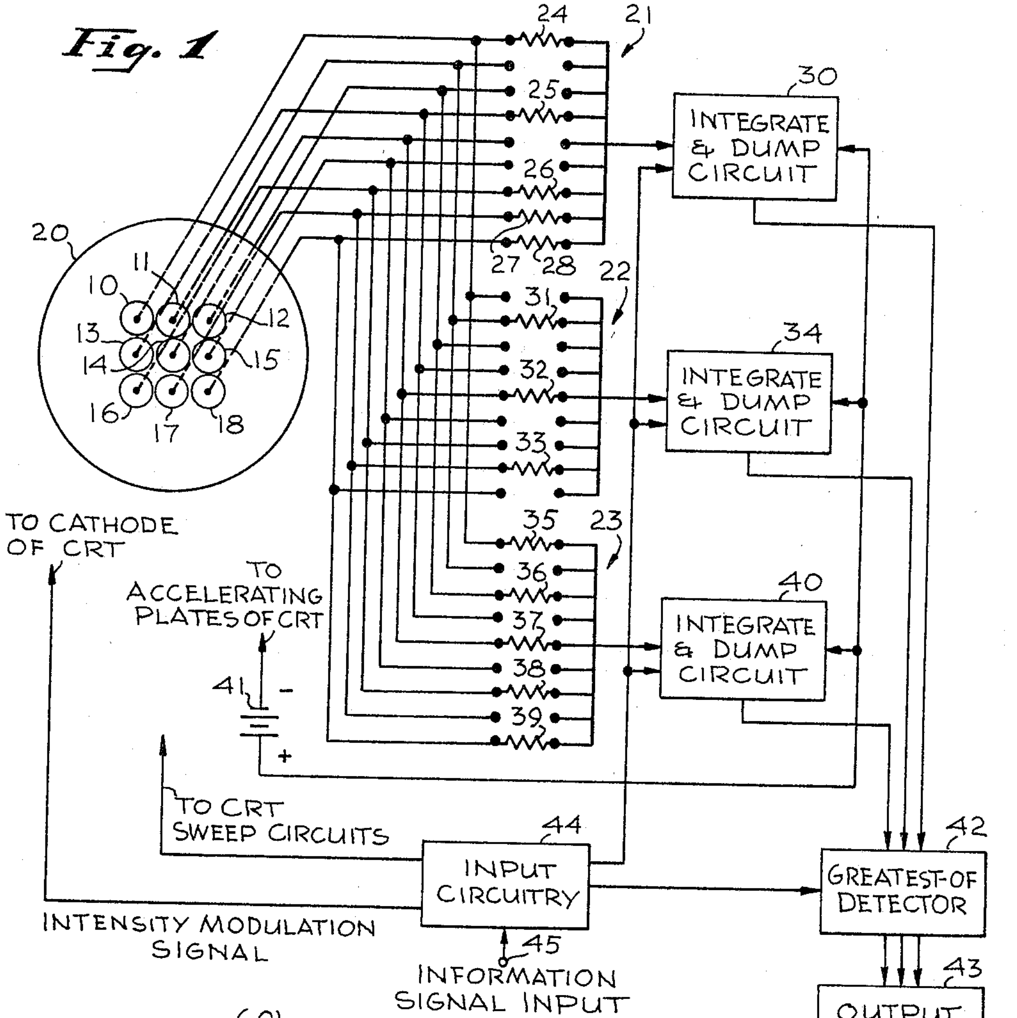
FIGURE 1 shows an embodiment by means of which the fundamental principles of the invention may be easily explained.

Referring now to the drawings and in particular to FIG. 1 thereof, the first embodiment is shown to include a plurality of nine small metallic plates arranged in three rows, one below the other. The plates are designated 10 through 18 and are mounted substantially flush with the inside surface of a catrode-ray tube face or screen whose outline 20 is shown. Three different resistor matrices, generally designated 21, 22 and 23, are connected in parallel to metallic plates 10 through 18, the resistors in each of the matrices being arranged and connected so as to have a definite correspondence with a particular or certain type of electron-beam pattern that might be projected upon the plates. More specifically, matrix 21 includes five resistors 24 through 28 respectively connected at one of their ends to metallic plates 10, 13, 16, 17 and 18, the other of these resistor ends being joined to form a common line leading to an integrate and dump circuit 30. It will be noticed that the metallic plates just enumerated substantially form the letter L so that matrix 21 may be said to have a correspondence with an L-shaped pattern. This will more clearly be seen when the operation of the embodiment is taken up for consideration.

In the same way, matrix 22 includes three resistors designated 31, 32 and 33 which are connected between metallic plates 11, 14 and 17, respectively, and an integrate and dump circuit 34. From the arrangement of the plates, it will be observed that plates 11, 14 and 17 substantially conform to the letter "I" so that matrix 22 may be said to have a definite correspondence to an I-shaped pattern. With respect to matrix 23, this matrix includes five resistors, designated 35 through 39, connected in the manner previously described between metallic plates 10, 12, 14, 16 and 18 and an integrate and dump circuit 40. By looking to the plates last mentioned, it will be seen that they are in the shape of the letter "X" so that matrix 23 may be said to have a definite correspondence with an X-shaped pattern.

Integrate and dump circuits 30, 34 and 40 are well known circuits and need not, therefore, be shown or described in great detail. Suffice it to say, therefore, that each of the circuits includes an integrator network, such as a series-connected resistor-capacitor combination, and a dischrage or dump network connected across the capacitor portion of the integrator network. The function of the integrator network is to accumulate current on the capacitor during a prescribed interval of time whereas it is the function of the dump network to discharge the capacitor at the end of that interval. The dump network may, for example, take the form of a diode arrangement that is gated ON at the end of the abovesaid time interval to short the capacitor plates to ground. Circuits 30, 34 and 40 are connected to the positive terminal of a battery or other suitable voltage source 41, the positive potential respectively being applied through these circuits to matrices 21, 22 and 23, whereby this same positive potential is applied through the low-valued resistors therein to the metallic plates to which the resistors are connected. Thus, a positive potential is applied to plates 10 through 14 and plates 16 through 18. The negative terminal of battery 41 is returned to the accelerating plates of the cathode-ray tube associated with the tube screen 20.

The embodiment of FIG. 1 further includes a greatest of detector 42 to which integrate and dump circuits 30, 34 and 40 are connected, the output end of detector 42 being fed to output apparatus 43. Greatest-of detector 42 is that type of apparatus which, at the end of the sweep time interval, that is, at the end of the last scan by the electron beam, makes a determination as to which of the integrator networks has stored the most current. Several different kinds of greatest-of detectors may be utilized, one of them being shown in FIG. 2 and will shortly be described. Finally, a combination of input circuitry 44 is connected between greatest-of detector 42 and an input terminal 45 to which information signals are applied. Input circuitry 44 is standard equipment and may include amplifiers, mixers demodulation apparatus, pulse-delay apparatus, etc. Input circuitry 44 includes two additional outputs which respectively connect to the cathode and sweep circuits of the cathode-ray tube.

Figure 2:
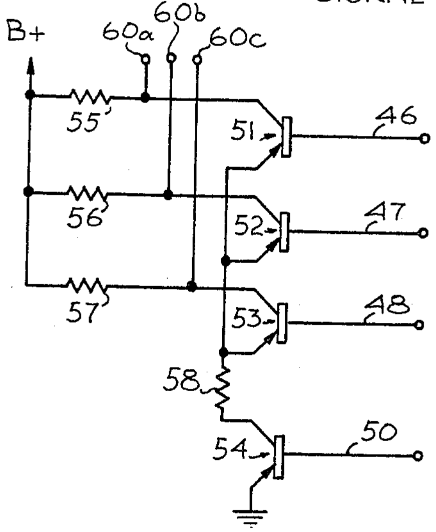
FIGURE 2 is a schematic circuit of a greatest-of detector that may be used in the embodiments of FIGS 1 and 4.

As was previously mentioned, a greatest-of detector is shown in FIG. 2 which includes three input lines 46, 47 and 48 that are respectively connected to the output ends of integrate and dump circuits 30, 34 and 40. A fourth input line to the detector, designated 50, is coupled to the output end of input circuitry 44 and is the line on which synchronizing pulses are applied to the detector. Also included are a plurality of four transistors generally designated 51 through 54, three of them, namely, transistors 51, 52 and 53, being used in conjunction with the integrate and dump circuits and transistor 54 being used for synchronizing purposes. Accordingly, the base elements of transistors 51, 52 and 53 are respectively connected to input lines 46, 47 and 48, the collector elements of these transistors respectively being connected through three resistors 55, 56 and 57 to a source of positive voltage designated B+. As for the emitter elements, these are electrically tied to the same end of a resistor 58 whose other end is connected to the collector element of transistor 54. The emitter element of transistor 54 is shorted to ground while its base element is connected to input line 50. The three output terminals for the greatest-of detector are designated 60*a*, 60*b* and 60*c* and these are respectively connected to the collector elements of the transistors, as shown in the figure.

The greatest-of detector is put into operation when an enabling or synchronizing pulse is applied to transistor 54, thereby allowing transistors 51 through 53 to compare the amplitudes of the signals applied to them and, in essence, select the input having the largest amplitude. The action of transistors 51 through 53 is such that current will flow through resistor 58 from only one of these transistors, that being the one with the greatest input voltage. All other transistors are back-biased by the voltage drop across resistor 58 due to current flow through the one transistor which has had the greatest voltage generated in its input circuit. Current flow through only one of the three possible transistor paths, namely, the paths including resistors 55, 56 and 57, results in an output at only one terminal of output terminals 60*a*, 60*b* and 60c, thereby permitting identification of the unknown pattern.

Considering now the operation of the entire FIG. 1 system, an information signal is applied via input terminal 45 to input circuitry 44 which, in response thereto, produces an intensity-modulation signal that is applied to the cathode of the cathode-ray tube. In addition, circuitry 44 produces synchronizing signals that are applied to integrate and dump circuits 30, 34 and 40, to greatest-of detector 42, and to the sweep circuits of the cathode-ray tube. Assuming, for sake of example, that the signal applied to the cathode of the abovesaid cathode-ray tube represents the letter "L" of the alphabet, the electron beam incident upon and sweeping across metallic plates 10 through 18 is correspondingly intensity modulated so that it is ultimately formed into an L configuration.

Stated differently, the electron beam is gated ON and OFF at the appropriate times by the intensity-modulation signal so that the electron beam is only incident upon plates 10, 13, and 16 through 18, the electron beam being gated OFF when it is directed at plates 11, 12, 14 and 15 so that no electrons are received by these plates. When the beam is directed at plate 10, current is attracted only through resistors 24 and 35 to integrate and dump circuits 30 and 40, respectively. Since the electron beam is gated OFF when it is directed at plates 11 and 12, no current will flow to the integrate and dump circuits at these times. Again, when the electron beam is directed at plate 13, current flows only through resistor 25 to integrate and dump circuit 30. For the reasons previously mentioned, no current flows passed to the integrate and dump circuits from plates 14 and 15. Finally, when the electron beam is directed at plate 16, current will flow through resistors 26 and 38 to integrate and dump circuits 30 and 40, respectively; when the beam is directed at plate 17, current will flow through resistors 27 and 33 to integrate and dump circuits 30 and 34, respectively; and when it is directed at plate 18, current will flow through resistors 28 and 39 to integrate and dump circuits 30 and 40, respectively.

As previously stated, the integrate and dump circuits accumulate the current flowing to them unit the end of the complete sweep period and, in this respect, it will be obvious that the greatest amount of current passed through resistor matrix 21 during this first described sweep period, with the result that integrate and dump circuit 30 has stored more current at the end of said period that the other of such circuits. At the end of the complete sweep period, a synchronizing pulse is applied to greatest-of detector 42 which, in the manner previously explained, and in cooperation with output apparatus 43, identifies the electron beam configuration or pattern, thereby recognizing the previously applied information signal. Immediately following the time of identification, a synchronizing pulse is applied simultaneously to integrate and dump circuits 30, 34 and 40, as a result of which the current stored therein during the prior sweep interval are returned to ground, thereby readying these circuits for the next sweep period.

The next information signal is applied to input terminal 45 at the same time that the electron beam is returned to plate 10 and, therefore, an intensity-modulation signal representing a second unknown pattern is applied to the cathode of the cathode-ray tube. In this instance, the pattern selected for purposes of explanation is that of the letter "I." By following through in the same manner as was previously done in connection with the L pattern, it will be seen that, while some current will flow through resistor matrices 21 and 23 to integrate and dump circuits 30 and 40, respectively, the maximum amount of current will flow through resistor matrix 22 to integrate and dump circuit 34 during this second sweep interval. Consequently, when greatest-of detector 42 is activated by a synchronizing pulse out of input circuitry 44, it will be recognized that the information signal received at that time represents an I pattern. At this time, the different amounts of current respectively stored in circuits 30, 34 and 40 are once again dumped. Similarly, during the next complete sweep cycle, it will be found that the electron beam is received only by plates 10, 12, 14, 16 and 18 and, therefore, by following the described procedure, it will be found that the then received information signal represents an X pattern.

It should be mentioned here that the embodiment of FIG. 1 has intentionally been limited to the recognition of only three different patterns in order to expedite and facilitate an understanding of the invention. Acutally, therefore, the system shown can be very greatly enlarged to recognize a much larger number of patterns and also patterns that are more complex than letters of the alphabet or numerals. In this regard, much improved resolution can be obtained by greatly increasing the number of plate elements in the cathode-ray tube and, correspondingly, the number of resistor elements in the resistor matrices. However, irrespective of the number of plates, the number of matrices and the number of resistors per matrix used, the basic principles, as explained in connection with the relatively simple system of FIG. 1, remain the same.

Figure 3:
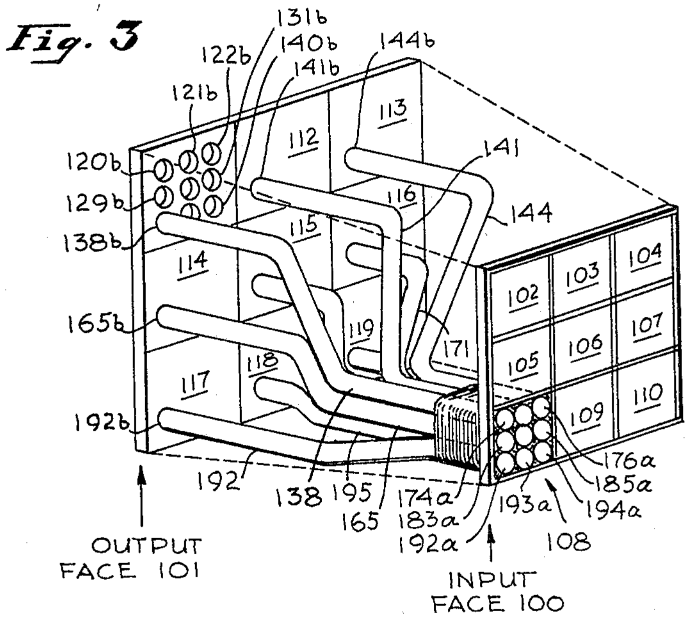
FIGURE 3 illustrates the manner in which wire conductors may be bundled together for purposes of the present invention.
Figure 4:
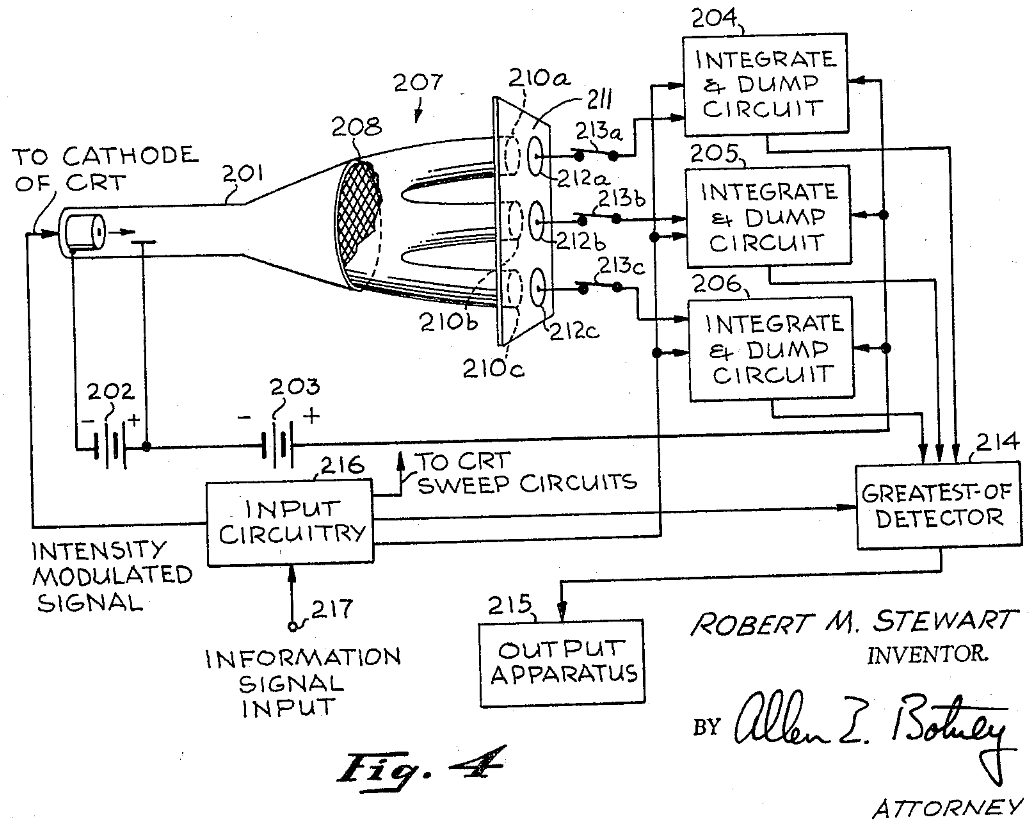
FIGURE 4 is a diagram of a second embodiment of the present invention that includes the apparatus of FIG. 3.

Before referring to FIGS. 3 and 4 wherein another and preferred embodiment of the invention is shown, it should be mentioned that if a large number of wire conductors are gathered together in a bundle, an electron-beam image or pattern projected upon the input surface or face at one end of these conductors will be reproduced on the output face at the other end if a constant difference of potential is maintained between the two ends. By gathering the conductors together at the output end of the bundle, a plurality of smaller bundles and, therefore, a plurality of smaller output faces, may be produced equal in number to the number of data patterns stored on the memory plate. The bundle structure serves to sample the input pattern and multiply the sampled images for comparison with the stored data.

Stated differently, if the electron-beam receiving conductor face is divided into N areas, each area containing the input ends of K discrete conductors, then the output ends of these same conductors may be stranded and bundled in such a manner as to produce K output faces, each output bundle or face including the output ends of N fibers, one from each of N areas on the input surface. It will thus be seen that if a pattern is now projected on the input end of the bundled conductors, K such patterns of reduced size will respectively be produced at the K output faces if the voltage between each output face and the input face is constant. In this manner, the unknown data pattern is made available for simultaneous projection against the data patterns stored on the memory plate. Of course, if the voltages between the input and output faces are not constant, that is to say, if the conductivity in the plane of the aforesaid output faces vary, then somewhat different results will follow as will be seen later.

Referring now to FIG. 3, a bundle of wire conductors of the type mentioned is shown. However, to expedite and facilitate an understanding of the invention, the referred-to bundle comprises only eighty-one conductors and, to facilitate matters still further, only a portion, namely, nine of these eighty-one conductors are shown in the figure. It will be recognized, however, that a bundle may comprise hundreds, thousands, hundreds of thousands, or even millions of these conductors and that a bundle of only eighty-on conductors is presented in FIG. 3 for illustrative purposes only. As shown, the conductors are bundled together in such a manner that their ends form two plane surfaces referred to in the figure as input pattern face 100 and output pattern face 101. Faces 100 and 101 are divided into imaginary areas which may have almost any shape and size as predetermined. Furthermore, the number of areas into which face 100 is divided, need not necessarily be equal to the number of areas into which face 101 is divided. Briefly stated, the number of areas into which face 101 is divided is equal to the number of conductor ends in each area of face 100 which, in turn, is determined by the number of stored bits of data, as will be more clearly understood later.

In the figure, faces 100 and 101 are each arbitrarily divided into nine substantially square areas, each such area including the ends of nine wire conductors. The nine areas of face 100 are respectively designated 102 through 110 and, similarly, the nine areas of face 11 are respectively designated 111 through 119. The conductors, on the other hand, are designated 120 through 200, the conductor ends included in face 100 being designated **120*a* through 200*a* and the fiber ends included in face 101 being designated 120*b* through 200*b*. Although only nine of the eighty-one conductors are actually shown, these nine are nevertheless designated according to their position in the conductor sequence. Hence, they are designated 138, 141, 144; 165, 168, 171; and 192, 195, 198. The conductor ends actually shown included in face 100 are designated 174*a*, 175*a*, 176*a*; 183*a*, 184*a*, 185*a*; and 192*a*, 193*a*, 194*a* and the conductor ends actually shown included in face 101 are likewise designated 138*b*, 141*b*, 144*b*; 165*b*, 168*b*, 171*b*; and 192*b*, 195*b*, 198*b*. The positions of some additional conductor ends in output face 101 are illustrated in area 111, these properly being designated 120*b*, 121*b*, 122*b*; 129*b*, 130*b*, 131*b*; and 139*b*, 140*b*.**

Considering the apparatus of FIG. 3 still further, the conductors are bundled together in a manner such that the conductor ends in face 101 are arranged differently than the conductor ends in face 100. More specifically, conductors 120–200 are so assembled that those conductors whose ends lie and fill a single area of face 100 are dispersed at their other ends to the extent that these other ends respectively lie in all the areas of face 101, the positions occupied by these other ends in the areas of face 101 respectively being identical and, moreover, the particular area in face 101 in which any one conductor end lies being determined by the position the associated other end occupies in the area of face 100.

Thus, for example, wire conductors 138, 141, 144, 165, 168, 171, 192, 195 and 198 have their ends **174*a*, 175*a*, 176*a*, 183*a*, 184*a*, 185*a*, 192*a*, 193*a* and 194*a*, respectively, occupying area 108 in face 100, the delineated ends being positioned to form three horizontal rows for sake of clarity. Associated ends 138*b*, 141*b*, 144*b*, 165*b*, 168*b*, 171*b*, 192*b*, 195*b* and 198*b*, however, do not lie in or occupy any one area of face 101 but, instead, these ends lie in areas 111–119 inclusive, one end in each area. Hence, end 138*b* lies in area 111, end 141*b* in area 112, end 144*b* in area 113, end 165*b* in area 114, etc., end 198*b* lying in area 119. It will also be noticed from the figure that the relative positions of the ends in area 108 of face 100 are maintained by the associated other ends in face 101. Thus, for example, looking from left to right, ends 174*a*, 175*a* and 176*a* lie in a row in face 100 and, similarly, looking from left to right, ends 138*b*, 141*b* and 144*b* lie in a row in face 101. The same is true with respect to the other ends discussed. Furthermore, it will be recognized that if areas 102–110 are made small enough, the component of the current image on face 100 transmitted to face 101 by any one wire conductor will correspond closely to the electron beam intensity incident upon the small area of face 100 associated with that one wire conductor. In the figure, for example, the current flow to areas 111–119 of face 101 by means of conductors 138, 141, 144, 165, 168, 171, 192, 195 and 198 corresponds closely to the density of the current incident upon area 108 of face 100. Since areas 111–119 on face 101 are also intercoupled with areas 102–107, 109 and 110 on face 100 in the same manner as with area 108, it will be seen that miniature reproductions will appear on all areas of face 101 of images or patterns projected on face 100 and, furthermore, that these reproductions will occur simultaneously; providing, of course, that the same positive potential is applied to all the conductor ends in face 101**. As was previously mentioned, somewhat different results would be obtained if the potential was not constant but varied between conductors.

It was previously mentioned that the apparatus of FIG. 3 was illustrative in nature only and that very much larger numbers of wire filaments may be put into use than the number actually shown in the figure. Thus, if an output face includes enough smaller areas of the type described, a sufficient number of these smaller output faces will be provided which will make it possible to simultaneously compare an unknown image pattern representing a bit of data with all the recorded transparencies representing stored bits of known data. As a matter of fact, in view of the small diameters possible for these wire filaments, as many as $10^6$ conductors can, for example, be bundled together so that a local input area of $10^3$ conductors is connected to every one of $10^3$ local output areas, each local output area thereby also being made up of $10^3$ conductors. It is readily seen, therefore, that the apparatus of the present invention makes it possible to compare a large amount of stored data with an unknown bit of data without being complex, bulky, heavy or expensive.

Finally, it should be mentioned that in order for the apparatus of FIG. 3 to perform properly, it is necessary that the wire conductors be suitably insulated from each other. More specifically, the wire conductor ends in any one area of input face 100 are not insulated from each other but they are, as a group, insulated from the groups of wire conductor ends in adjacent areas of face 100. Thus, for example, ends **174*a*, 175*a*, 176*a*, 183*a*, 184*a*, 185*a*, 192*a*, 193*a*, 194*a* in area 108 of face 100 need not be and are not insulated from each other but this entire groups of wire ends is insulated as a whole from the other groups of wire ends in areas 105, 106 and 109. An attempt has been made to illustrate this insulative separation by means of the shading and the relatively dark and thick lines used to define the areas. At output face 101, on the other hand, all the wire ends are insulated from each other. Thus, for example, wire end 138*b* is insulated from adjacent wire ends 129*b*, 130*b* and 139*b*. The fact that conductor ends 120*b*–200*b*** are insulated from each other is illustrated in the figure by the physical spacings between them. Actually, however, they may be adequately insulated by means of an insulative coating applied to them, which would permit them to be more closely spaced than that shown.

Reference is now made to FIG. 4 wherein a preferred embodiment, using the apparatus of FIG. 3, is shown. The system includes a slightly modified cathode-ray tube 201 appropriately connected to an accelerating voltage source 202 and a bias voltage source 203, the high potential or positive terminal of source 203 being connected to the input to three integrate and dump circuits 204, 205 and 206. Cathode-ray tube 201 is modified in the respect that instead of a phosphor-coated glass screen as in a standard tube, the glass screen has either been partially or entirely removed to permit the insertion and the snug fitting of the input face of a mixed bundle of wire conductors generally designated 207. More specifically, wire bundle 207 is of the type previously described in connection with FIG. 3 but, for sake of simplicity and clarity, its wires are arranged to form only three output faces. Is should be noted once again, however, that the wires in these bundles can be arranged to form much larger numbers of output faces. Bundle 207 is mounted so that its input face is just inside the cathode-ray tube screen, substantially flush with it, the input end of the bundle being bonded or sealed to the remaining tube screen so as to maintain the vacuum required inside the tube. The input face of bundle 207 is designated 208 whereas the three output faces into which the bundle is drawn are designated **210*a*, 210*b* and 210*c***.

An information storage film or plate 211 is provided which on one side is contiguous with faces **210*a*, 210*b* and 210*c***. A plurality of three metallic collector plates 212*a*, 212*b* and 212*c* are mounted onto the other side of member 211, the collector plates being mounted so as to respectively be in a face-to-face relationship, that is to say, in registration with the several output faces 210*a*, 210*b* and 210*c*. Furthermore, the size of the collector plates are sufficiently large such that the bundle faces are entirely covered by them. In connection with film or plate 211, it should be made of a material upon which patterns may be recorded or stored in the form of transparencies as this term was previously defined. One material that may be used is a photo-emulsion on a thin semi-conducting base, in which case the variable conductivity would be obtained or brought about by differences in the amount of reduced silver. Respectively connected to plates 212*a*, 212*b* and 212*c* are three switches 213*a*, 213*b* and 213*c*, the switches respectively being coupled to the input ends of integrate and dump circuits 204, 205 and 206. Finally, the system of FIG. 4 includes a greatest-of detector 214, output apparatus 215 and input circuitry 216. These three last-named elements are connected in exactly the same manner as in the system of FIG. 1 and hence, to avoid being redundant, a description of their connections will be avoided. As before, the input to circuitry 216 is the input to the entire system and is designated 217.

Assuming a photo emulsion on memory plate 211, it is deemed worthwhile in considering the operation of the FIG. 4 system to initially describe the manner in which information is selectively recorded or stored. In this respect, a number of patterns (three in the example shown) which are to be automatically recognized at some future time are projected in sequence in the cathode-ray tube oscilloscope. At the time the first pattern is projected, switch 213*a* is closed while switches 213*b* and 213*c* are opened so that the positive potential of voltage source 203 is applied only to collector plate 212*a*. Furthermore, the electron beam having the configuration of said first pattern is projected against input face 208 of wire conductor bundle 207, the result being that a miniaturized version of the electron-beam configuration is passed to output face 210*a*. Due to the positive potential on collector plate 212*a*, the smaller electron beam appearing at output face 210*a* and having the same pattern configuration as the larger beam received at input face 208 is attracted to the collector plate and, therefore, passes through the photo-emulsion coating and semiconductor base facing the wire conductor bundle. This will produce a permanent change in the information storage material in the area through which the electron beam has passed, namely, varying amounts of silver will become deposited on the memory plate in a pattern that corresponds very closely with the variations in the intensity of the electron beam and its configuration.

More specifically, the conductivity in that locale will be permanently affected, the manner in which it is affected being such that the conductivity will vary with the variations in the amounts of current passed through the material, the greatest conductivity resulting where the greatest amount of current passed through. Thus, a variable conductivity pattern has been permanently recorded on member 211 opposite bundle face 210*a*. Once this is done, switch 213*b* is closed and all other switches are opened, the second pattern in the sequence then being projected onto face 208, in consequence of which a second recording in terms of conductivity is effected on member 211 opposite face 210*b*. Following this, switch 213*b* is opened and switch 213*c* is closed, the third pattern in the sequence then being applied with the same results, namely, a pattern of variable conductivity conforming to the electron beam pattern is permanently recorded on member 211 opposite face 210*c*. Of course, the same steps would be pursued if larger numbers of data were to be recorded. Storage member 211 is then suitably processed to "bring out" and permanently fix as transparencies the information recorded thereon. All switches are then closed and the system is ready for use.

Figure 5:
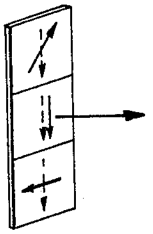
FIGURE 5 illustrates the manner in which simultaneous comparisons are made between an unknown bit of data and stored data.

The manner in which the patterns may be recorded is illustrated in FIG. 5 by means of the solid-line arrows shown therein. Three solid arrows are shown in all, the arrows pointing in three different directions. In each case, however, the arrow was formed in response to an electron beam shaped and directed like the arrow recorded. Of course, the arrows are used representatively here and are not the kind of information that would actually be recorded, which information might be, as previously mentioned, code patterns, terrain patterns, etc.

Returning now to the operation of the system in FIG. 4, since a positive potential is applied through integrate and dump circuits 204, 205 and 206 to metal plates 212*a*, 212*b* and 212*c* and from these plates through the conductive data patterns to output faces 210*a*, 210*b* and 210*c*, when an unknown electron-beam pattern is incident upon face 208 of conductor bundle 207 the pattern of the electron beam is simultaneously compared with the conductivity patterns recorded on memory plate 211. In consequence thereof, different currents respectively pass through member 211 to collector plates 212*a*, 212*b* and 212*c*, the greatest current passing through whereat the greatest match or similarity exists between the pattern to be identified and the pattern recorded. This explanation may be enhanced by referring once again to FIG. 5 wherein alongside the solid-line arrows are broken-line arrows representing the unknown pattern to be identified. By comparing the solid-line arrows and the broken-line arrows, it will be seen that the unknown pattern is identical with only one of the many known recorded patterns. Accordingly, it is only in the area where such identity exists that maximum current will pass through, as indicated by the large outwardly-pointing arrow in the figure.

The different currents received at collector plates 210*a*, 210*b* and 210*c* respectively flow into integrate and dump circuits 204, 205 and 206 wherein the electrical charges associated with these currents are stored. At the end of the interval of time during which the electron-beam pattern is projected upon input face 208 and pattern comparisons made, a synchronizing pulse from input circuitry 216 is applied to greatest-of detector 214 which, in response thereto and in accordance with the description presented earlier, determines which one of the integrate and dump circuits has stored the greatest amount of current. Identification of the electron-beam pattern is then made by output apparatus 215 which, in so doing, identifies the waveform applied to input terminal 217 which produced such an electron-beam pattern. Immediately thereafter, another pulse is applied to the integrate and dump circuits for the purpose of discharging to ground or dumping the electrical current respectively accumulated by these circuits during the preceding time interval. At this point, the system is ready to identify a second pattern and it will be recognized that these further patterns may be identified in the manner delineated above.

Although a number of particular arrangements of the invention have been illustrated above by way of example, it is not intended that the invention be limited thereto. Thus, for example, a parallel type of greatest-of detector was shown and described herein but a serial greatest-of detector may be used just as well. In this latter type of detector, the electrical current stored in the integrate and dump circuits are "looked at" in succession rather than simultaneously. Again, different types of materials may be used for memory or information recording purposes so that the substances referred to herein are only indicative. Accordingly, the invention should be considered to include any and all modifications, alterations or equivalent arrangements falling within the scope of the annexed claims.

Having thus described the invention, what is claimed as new is:

1. A data correlation system wherein an unknown bit of data is identified by comparison with known bits of data, said system comprising: apparatus for projecting an electron-beam in a pattern that corresponds to an unknown bit of data; a memory in which the known bits of data are stored as variable conductivity patterns; means for applying the same positive potential to all of said variable conductivity patterns; electrically conductive means for coupling said variable-conductivity patterns in parallel to said projected electron-beam pattern to simultaneously compare said stored patterns with said projected pattern, whereby different amounts of electrical current pass through said stored patterns with the maximum amount of current passing through whereat the conductivity pattern and the projected pattern are most identical; and output apparatus receptive of said electrical current for detecting the conductivity pattern whereat the maximum amount of electrical current is passed.

2. The data correlation system defined in claim 1 wherein said electrically conductive means includes a bundle of wire conductors whose ends form first and second image faces, said first and second image faces respectively being divided into first and second numbers of areas, said bundle of wire conductors including a plurality of groups of conductors equal in number to said second number of areas, each group of conductors including a plurality of conductors equal in number to said first number of areas, each group of conductors in said bundle intercoupling an area in said second face with every area in said first face, the position of a conductor end in an area in said second face in relation to the other conductor ends in said area corresponding to the position of the associated intercoupled area in relation to the other areas in said first face, the electron-beam pattern being projected upon said second face and said positive potential being applied through said conductivity patterns to said first face.

3. The data correlation system defined in claim 1 wherein said electrically conductive means includes a bundle of wire conductors whose ends form first and second faces, said first face being divided into a predetermined number of areas having equal numbers of conductor ends therein and said second face being divided into a number of areas equal to the number of conductor ends in an area of said first face, said conductors being arranged in such a manner that the conductor ends in each area of said first face are coupled through the respective interconnecting conductors to conductor ends in each and every area of said second face, the group of conductor ends in each area of said first face being insulated from the groups of conductor ends in adjoining areas of said first face and the conductor ends throughout said second face being insulated from each other.

4. The data correlation system defined in claim 1 wherein said electrically conductive means includes a plurality of electrically-conductive elements arranged to form a surface upon which said electron beam is projected, said elements being electrically insulated from each other and electrically connected in parallel to said variable conductivity patterns.

5. The data correlation apparatus defined in claim 1 wherein said variable conductivity patterns are resistor matrices electrically connected in parallel to said electrically-conductive means, the resistors in said matrices being differently connected in order that said matrices respectively correspond to the known bits of data.

6. The data correlation system defined in claim 1 wherein said electrically conductive means includes a plurality of electrically-conductive elements arranged to form a surface upon which said electron beam is projected, said elements being electrically insulated from each other; and said variable conductivity patterns are resistor matrices electrically connected in parallel to said elements, the resistors in said matrices being differently connected in order that said matrices respectively correspond to the known bits of data.

7. The data correlation system defined in claim 1 wherein said memory includes a thin electrically insulative base plate that is coated on one side thereof with a material whose conductivity at any point thereon may be permanently affected by the passage of current therethrough, the ultimate conductivity at a point thereon being a function of current charge passed through at said point.

8. The data correlation system defined in claim 1 wherein said memory includes a thin electrically insulative base plate that is coated on one side thereof with a material whose conductivity at any point thereon may be permanently affected by the passage of current therethrough, said material having a plurality of patterns of variable conductivity recorded thereon; and a plurality of electrically conductive plates mounted on the other side of said base plate in registration with said plurality of variable-conductivity patterns.

9. The data correlation system defined in claim 1 wherein said electrically conductive means includes a bundle of wire conductors whose ends form first and second faces, said first face being divided into a predetermined number of areas having equal numbers of conductor ends therein and said second face being divided into a number of areas equal to the number of conductor ends in an area of said first face, said conductors being arranged in such a manner that the conductor ends in each area of said first face are coupled through the respective interconnecting conductors to the conductor ends in each and every area of said second face, the group of conductor ends in each area of said first face being insulated from the groups of conductor ends in adjoining areas of said first face and the conductor ends throughout said second face being insulated from each other; and wherein said memory includes a thin electrically insulative base plate that is coated on one side thereof with a material whose conductivity at any point thereon may be permanently affected by the passage of current therethrough, said material being contiguous to said second face and having a plurality of patterns of variable conductivity recorded thereon in registration with the areas of said second face, and a plurality of electrically conductive plates mounted on the other side said base plate in registration with said plurality of variable-conductivity patterns.

10. In an electronic data correlation system, apparatus for simultaneously comparing an electron-beam pattern with a plurality of variable conductivity patterns, said apparatus comprising: a bundle of wire conductors whose ends form first and second faces, said first face being divided into a predetermined number of areas having equal numbers of conductor ends therein and said second face being divided into a number of areas equal to the number of conductor ends in each area of said first face, said conductors being arranged in such a manner that the conductor ends in each area of said first face are coupled through their respective interconnecting conductors to conductor ends in each and every area of said second face, the group of conductor ends in each area of said first face being electrically insulated from the groups of conductor ends in adjoining areas of said first face and the conductor ends throughout said second face being insulated from each other.

11. In an electronic data correlation system, apparatus for simultaneously comparing an electron-beam pattern with a plurality of variable conductivity patterns, said apparatus comprising: a bundle of wire conductors whose ends form first and second faces, said first and second faces respectively being divided into first and second numbers of areas, said bundle of conductors including a plurality of groups of conductors equal in number to said second number of areas, each group of conductors including a plurality of conductors equal in number to said first number of areas, each group of conductors in said bundle intercoupling an area in said second face with every area in said first face, the position of a conductor end in an area in said second face in relation to the other conductor ends in said area corresponding to the position of the area intercoupled by its respective interconnecting conductor in relation to the other areas in said first face, the group of conductor ends in each area of said second face being insulated from the groups of conductor ends in adjoining areas and the conductor ends throughout said first face being insulated from each other.

12. In an electronic data correlation system for comparing an unknown bit of data represented by an electron-beam pattern with electrically recorded patterns of known bits of data, apparatus comprising: a memory member upon which the known bits of data are recorded in the form of variable conductivity patterns; means for applying the same positive potential to said variable conductivity patterns; a bundle of wire conductors having an input face at one end and an output face at the other end, said bundle being positioned to receive the electron-beam pattern at its input end and contiguously to said memory member at its output end, said wire conductors being internally arranged to simultaneously compare the pattern of said electron beam with the patterns of variable conductivity, current passing through said variable conductivity patterns at those points whereat they are in registration with said electron-beam pattern, the maximum amount of current passing through whereas the conductivity pattern and the electron-beam pattern are substantially identical.

13. A data correlation system wherein unknown bits of data are identified by comparing them in succession with known bits of data, said system comprising: input apparatus for successively projecting electron beams in patterns that respectively correspond to electrical signals representing unknown bits of data; a memory element including a thin electrically insulative base plate that is coated on one side thereof with a material whose conductivity at any point thereon is permanently affected by the passage of current therethrough, said material having a plurality of patterns of variable conductivity recorded thereon that respectively represent the known bits of data, and a plurality of electrically conductive plates mounted on the other side of said base plate in registration with said plurality of variable-conductivity patterns; a bundle of wire conductors interposed between said input apparatus and said memory element, said conductors being stranded in such a manner that said variable-conductivity patterns are coupled in parallel to each projected electron-beam pattern for simultaneously comparing said recorded patterns with each projected pattern, whereby different amounts of current respectively pass through said stored patterns to said plates with each comparison, the maximum amount of current passing through whereat the conductivity pattern and the projected pattern are most identical; a plurality of integrator networks respectively connected to said electrically conductive plates for storing the current passed thereto during each comparison; output apparatus coupled to said integrator networks for detecting whereat the maximum amount of current is stored; and means for discharging said integrator networks after each detection by said output apparatus.

14. The data correlation system defined in claim 13 wherein the ends of said wire conductors form first and second faces, said first face being divided into a predetermined number of areas having equal numbers of conductor ends therein and said second face being divided into a number of areas equal to the number of conductor ends in an area of said first face, the number of conductor ends in an area of said first face being equal to the number of known bits of data, said conductors being stranded in such a manner that the conductor ends in each area of said first face are coupled through the respective interconnecting conductors to conductor ends in each and every area of said second face, the group of conductor ends in each area of said first face being insulated from the groups of conductor ends in adjoining areas of said first face and the conductor ends throughout said second face being insulated from each other.

References Cited by the Examiner

UNITED STATES PATENTS

| | | | |
|---|---|---|---|
| 2,000,403 | 5/1935 | Maul | 340—146.3 |
| 2,646,465 | 7/1953 | Davis et al. | 340—146.3 |
| 2,723,308 | 11/1955 | Vroom | 340—146.3 |
| 2,978,675 | 4/1961 | Highleyman | 340—146.3 |
| 3,069,079 | 12/1962 | Steinbeck et al. | 340—146.3 |
| 3,104,369 | 8/1963 | Rabonow et al. | 340—146.3 |
| 3,125,683 | 3/1964 | Stewart et al. | 340—146.3 |
| 3,213,422 | 10/1965 | Fritze et al. | 340—146.3 |

MAYNARD R. WILBUR, *Primary Examiner.*

DARYL W. COOK, *Examiner.*

C. L. JUSTUS, K. CLAFFY, J. E. SMITH, *Assistant Examiners.*